United States Patent
Hidaka et al.

(10) Patent No.: US 12,095,894 B2
(45) Date of Patent: Sep. 17, 2024

(54) CLOCK RECOVERY WITH LOOP DELAY CANCELLATION

(71) Applicant: CREDO TECHNOLOGY GROUP LIMITED, Grand Cayman (KY)

(72) Inventors: Yasuo Hidaka, Cupertino, CA (US); Junqing Phil Sun, Cupertino, CA (US)

(73) Assignee: Credo Technology Group Limited, Grand Cayman (KY)

( * ) Notice: Subject to any disclaimer, the term of this patent is extended or adjusted under 35 U.S.C. 154(b) by 63 days.

(21) Appl. No.: 18/062,382

(22) Filed: Dec. 6, 2022

(65) Prior Publication Data

US 2024/0187204 A1   Jun. 6, 2024

(51) Int. Cl.
*H04L 7/00* (2006.01)
*H04L 7/033* (2006.01)

(52) U.S. Cl.
CPC .......... *H04L 7/0037* (2013.01); *H04L 7/0029* (2013.01); *H04L 7/0337* (2013.01)

(58) Field of Classification Search
CPC .... H04L 7/0037; H04L 7/0029; H04L 7/0337
See application file for complete search history.

(56) References Cited

U.S. PATENT DOCUMENTS

| | | | | |
|---|---|---|---|---|
| 6,359,878 B1* | 3/2002 | Lakkis | .................... | H04L 7/027 370/350 |
| 7,295,644 B1* | 11/2007 | Wu | ...................... | H03L 7/0807 375/375 |
| 10,447,509 B1 | 10/2019 | Cai et al. | | |
| 10,892,763 B1 | 1/2021 | Hidaka et al. | | |
| 2005/0207519 A1* | 9/2005 | Phang | ................. | H04L 27/2278 375/354 |
| 2005/0232383 A1* | 10/2005 | Sommer | .................. | H03L 7/08 375/353 |

OTHER PUBLICATIONS

Shirvani, Mansoor, Esmaeli, Mansooreh: "A New Method for Time-Delay Compensation in Control Systems," Iranian Journal of Chemistry and Chemical Engineering (IJCCE), vol. 27, No. 4, 2008, pp. 79-90.
Mueller, "Timing Recovery in Digital Synchronous Data Receivers", IEEE Transactions on Communications, vol. 24, No. 5, May 1976.
Musa, "High-speed Baud-Rate Clock Recovery", U. Toronto Thesis, 2008.

\* cited by examiner

*Primary Examiner* — Freshteh N Aghdam
(74) *Attorney, Agent, or Firm* — Ramey LLP; Daniel J. Krueger (57) ABSTRACT

An illustrative integrated receiver circuit includes: a sampling element that produces a digital receive signal by sampling an analog receive signal in accordance with a sampling signal; a timing error estimator that produces a timing error signal indicating an estimated timing error of the sampling signal relative to the analog receive signal; a first feedback path that controls a sampling signal phase to optimize the timing error signal, the first feedback path having an associated loop delay that causes a residual phase error; and a loop-delay cancellation circuit that buffers the sampling signal phase to reduce the residual phase error.

16 Claims, 8 Drawing Sheets

CLOCK RECOVERY WITH LOOP DELAY CANCELLATION

BACKGROUND

Digital communications occur between sending and receiving devices over an intermediate communications medium, e.g., a fiberoptic cable or insulated copper wire, having one or more designated communications channels, e.g., carrier wavelengths or frequency bands. Each sending device typically transmits symbols at a fixed symbol rate, while each receiving device detects a potentially corrupted sequence of symbols and attempts to reconstruct the transmitted data.

A "symbol" is a state or significant condition of the channel that persists for a fixed period of time, called a "symbol interval." A symbol may be, for example, an electrical voltage or current level, an optical power level, a phase value, or a particular frequency or wavelength. A change from one channel state to another is called a symbol transition. Each symbol may represent one or more binary bits of the data. Alternatively, the data may be represented by symbol transitions, or by sequences of two or more symbols. The simplest digital communication links use only one bit per symbol; a binary '0' is represented by one symbol (e.g., an electrical voltage or current signal within a first range), and binary '1' by another symbol (e.g., an electrical voltage or current signal within a second range).

Channel non-idealities produce dispersion which may cause each symbol to perturb its neighboring symbols, causing intersymbol interference (ISI). As the symbol rate increases, ISI can make it difficult for the receiving device to determine which symbols were sent in each interval, particularly when such ISI is combined with additive noise.

The open literature discloses many equalization and demodulation techniques for recovering digital data from the degraded receive signal even in the presence of ISI. A critical piece of such techniques is a determination of the correct sample timing, as sample timing directly affects the signal to noise ratio of the discrete samples. Strategies for detecting and tracking optimal sample times exist with varying degrees of tradeoff between simplicity and performance, but as sample rates increase well into the tens-of-gigahertz range, silicon-based CMOS circuit implementations approach the device design limits and may fail to provide adequate performance for existing clock recovery solutions. Further improvements in stability, bandwidth, and transient response may be desired even for the clock recovery methods and associated receivers, transceivers, links, and systems, disclosed by the present inventors in U.S. Pat. No. 10,892,763, "Second-order clock recovery using three feedback paths", which is hereby incorporated herein in its entirety.

SUMMARY

Accordingly, there are disclosed herein an illustrative digital communications receiver and illustrative clock recovery methods that incorporate loop delay cancellation. The performance of the illustrative clock recovery method and receiver has substantially increased bandwidth and improved transient response sufficient to support spread spectrum clocking at multi-gigahertz frequencies.

In a disclosed embodiment an integrated receiver circuit includes: a sampling element that produces a digital receive signal by sampling an analog receive signal in accordance with a sampling signal; a timing error estimator that produces a timing error signal indicating an estimated timing error of the sampling signal relative to the analog receive signal; a first feedback path that controls a sampling signal phase to optimize the timing error signal, the first feedback path having an associated loop delay that causes a residual phase error; and a loop-delay cancellation circuit that buffers the sampling signal phase to reduce the residual phase error.

An illustrative embodiment of a clock recovery method, which may be implemented in an integrated receiver circuit, includes: sampling an analog receive signal in accordance with a sampling signal to obtain a digital receive signal; producing a timing error signal indicating an estimated timing error of the sampling signal relative to the analog receive signal; controlling a sampling signal phase via a first feedback path to optimize the timing error signal, the first feedback path having an associated loop delay that causes a residual phase error; and buffering the sampling signal phase to reduce a magnitude of the residual phase error.

The foregoing circuits and methods may further be embodied as schematics (expressed in a hardware description language) or semiconductor manufacturing process mask patterns (expressed in GDSII or OASIS language) residing on nontransient information storage media.

Each of the foregoing embodiments may be implemented individually or in combination, and may be implemented with any one or more of the following features in any suitable combination: 1. the loop-delay cancellation circuit comprises a series of delay elements to replicate said loop delay of the first feedback path. 2. the loop-delay cancellation circuit further comprises a bypass path coupling a current sampling signal phase to a difference element that subtracts a buffered sampling signal phase from the current sampling signal phase to determine a residual phase error. 3. the first feedback path includes: a phase error accumulator; and a difference element that reduces an input to the phase error accumulator based on the residual phase error. 4. the loop-delay cancellation circuit further comprises a scaling element that scales the residual phase error by a coefficient $K_C$. 5. a phase interpolator coupled to the phase error accumulator to receive the sampling signal phase signal and to apply a corresponding phase shift to a clock signal to produce the sampling signal for the sampling element. 6. a fractional-N phase lock loop that provides the clock signal. 7. a second feedback path coupling the timing error signal to the phase interpolator to minimize a short-term frequency offset component of the estimated timing error. 8. a third feedback path coupling the timing error signal to the fractional-N phase lock loop to minimizing a frequency offset component of the estimated timing error. 9. using a series of delay elements to replicate said loop delay of the first feedback path. 10. a current sampling signal phase via a bypass path to a difference element that subtracts a buffered sampling signal phase from a current sampling signal phase to determine a residual phase error. 11. the first feedback path includes a phase error accumulator. 12. the second feedback path includes a frequency error accumulator. 13. the third feedback path includes a division-ratio error accumulator. 14. one or more difference elements that reduce inputs to the phase error accumulator, the frequency error accumulator, and/or the division-ratio error accumulator based on the residual phase error.

DETAILED DESCRIPTION

While specific embodiments are given in the drawings and the following description, keep in mind that they do not limit the disclosure. On the contrary, they provide the foundation for one of ordinary skill to discern the alternative forms, equivalents, and modifications that are encompassed in the scope of the appended claims.

Figure 1:
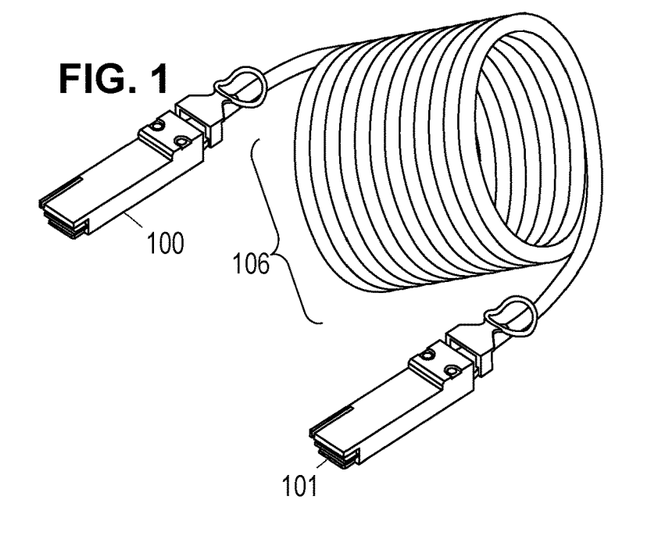
FIG. 1 is a perspective view of an illustrative active Ethernet cable ("AEC").

As an illustrative context for the disclosed timing recovery techniques, FIG. 1 shows an illustrative active Ethernet cable ("AEC") that may be used to provide a high-bandwidth communications link between devices in a routing network such as that used for data centers, server farms, and interconnection exchanges. The routing network may be part of, or may include, for example, the Internet, a wide area network, a local area network, or a storage area network. The linked devices may be computers, switches, routers, and the like. The cable includes a first connector 100 and a second connector 101 that are connected via optical or electrical signal conductors 106 in a cord.

To convert between signaling formats (or just to enhance robustness), each connector 100, 101 may include a powered transceiver that performs clock and data recovery ("CDR") and re-modulation of data streams in each direction. Such powered transceivers are also known as data recovery and re-modulation ("DRR") devices. Notably, the transceivers perform CDR and re-modulation not only of the output data streams as they exit the cable, but also of the input data streams as they enter the cable.

The connectors 100, 101 may be pluggable modules compliant with any one of the pluggable module standards, e.g., SFP, SFP-DD, QSFP, QSFP-DD, OSFP. In at least one contemplated embodiment, the cable connectors 100, 101 are quad small form-factor pluggable ("QSFP") transceiver modules, and more specifically, QSFP28 transceiver modules that exchange CAUI-4 data streams with the host. In other contemplated embodiments, the cable connectors are dual small form-factor pluggable ("DSFP") or small form-factor pluggable, double-density ("SFP-DD") transceiver modules, which exchange 100GBASE-KR2 data streams with the host. In still other contemplated embodiments, the cable connectors are different, such as with a QSFP28 to SFP-DD cable, a QSFP28 to DSFP cable, or a SFP-DD to DSFP cable.

Figure 2:
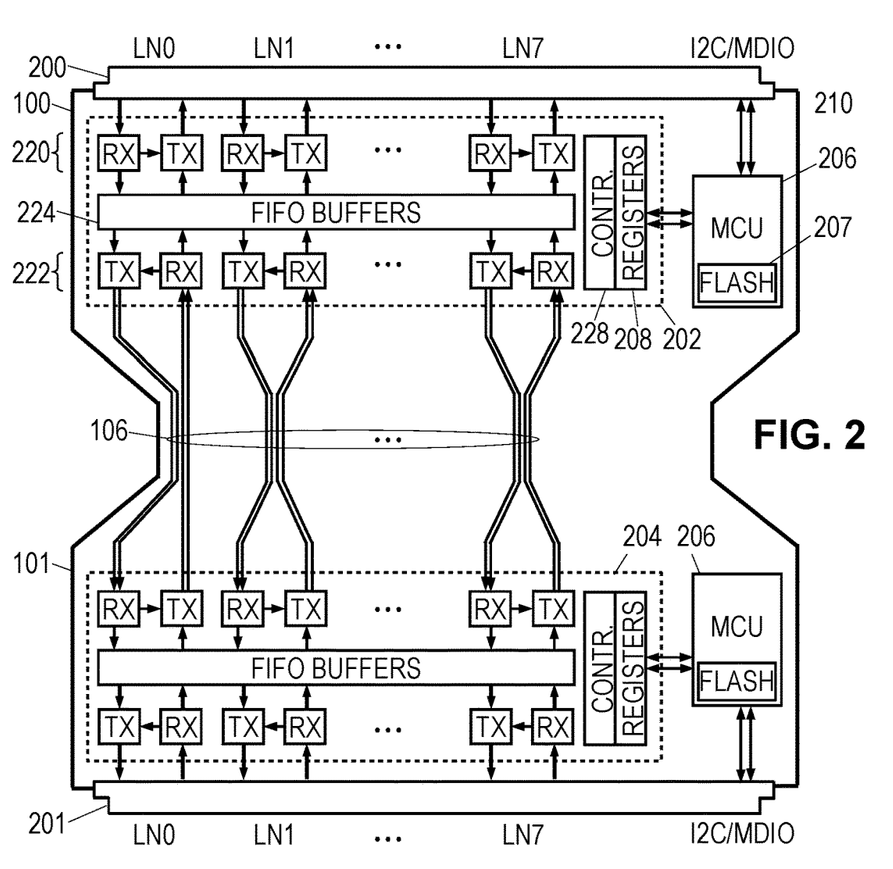
FIG. 2 is a block diagram of an illustrative AEC.

FIG. 2 is a block diagram of an illustrative AEC. Connector 100 includes a plug 200 adapted to fit a standard-compliant Ethernet port in a first host device to receive an electrical input signal carrying a data stream from the host device and to provide an electrical output signal carrying a data stream to the host device. Similarly, connector 101 includes a plug 201 that fits an Ethernet port of a second host device. Connector 100 includes a first DRR device 202 to perform CDR and re-modulation of the data streams entering and exiting the cable at connector 100, and connector 101 includes a second DRR device 204 to perform CDR and re-modulation of the data streams entering and exiting the cable at connector 101. The DRR devices 202, 204 may be integrated circuits mounted on a printed circuit board and connected to edge connector contacts via circuit board traces. The signal conductors 106 may be electrical conductors soldered to corresponding pads on the printed circuit board that electrically connect to the DRR devices.

In at least some contemplated embodiments, the printed circuit boards each also support a micro-controller unit ("MCU") 206. Each DRR device 202, 204 is coupled to a respective MCU device 206 which configures the operation of the DRR device via a first two-wire bus. At power-on, the MCU device 206 loads equalization parameters and/or other operating parameters from Flash memory 207 into the DRR device's configuration registers 208. The host device can access the MCU device 206 via a second two-wire bus that operates in accordance with the I2C bus protocol and/or the faster MDIO protocol. With this access to the MCU device 206, the host device can adjust the cable's operating parameters and monitor the cable's performance.

Each DRR device 202, 204, includes a set 220 of transmitters and receivers for communicating with the host device and a set 222 of transmitters and receivers for sending and receiving via conductor pairs running the length of the cable. The cable-facing transceivers 222 preferably send and receive using differential NRZ at 26.5625 GBd in each direction over each lane, or using differential PAM4 at 26.5625 GBd in each direction over half as many lanes.

The illustrated host-facing transceivers 220 support eight lanes LN0-LN7 for bidirectional communication with the host device, each bidirectional lane formed by two unidirectional connections with differential PAM4 signaling at 26.5625 GBd, such as may be achieved with 400GBASE-KR8. In other contemplated embodiments, the host-facing transceivers 220 support four lanes using differential NRZ signaling in accordance with the CAUI-4 specification. The DRR devices include a memory 224 to provide first-in first-out (FIFO) buffering between the transmitter & receiver sets 220, 222. An embedded controller 228 coordinates the operation of the transmitters and receivers by, e.g., setting initial equalization parameters and ensuring the training phase is complete across all lanes and links before enabling the transmitters and receiver to enter the data transfer phase. The embedded controller 228 employs a set of registers 208 to receive commands and parameter values, and to provide responses potentially including status information and performance data.

The transmitter/receiver sets 220, 222 are Serializer/Deserializer blocks. Serializer blocks convert parallel data streams into (high symbol rate) serial data streams for transmission over a serial channel, while Deserializer blocks convert (high symbol rate) serial data streams received from a serial channel into parallel, lower-rate data streams suitable for handling by more conventional digital circuitry. These conversion blocks are often referred to by the generic term "SerDes". Serializer blocks are coupled to, or may incorporate, channel-specific transmitters, while deserializer blocks are coupled to, or incorporate, channel-specific receivers.

Figure 3A:
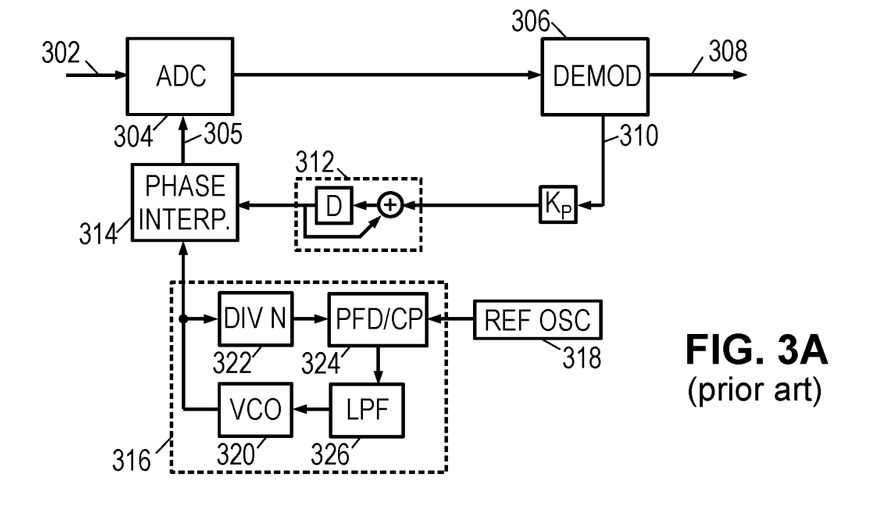
FIGS. 3A-3C are function-block diagrams of illustrative digital communications receivers having clock recovery.
Figure 3B:
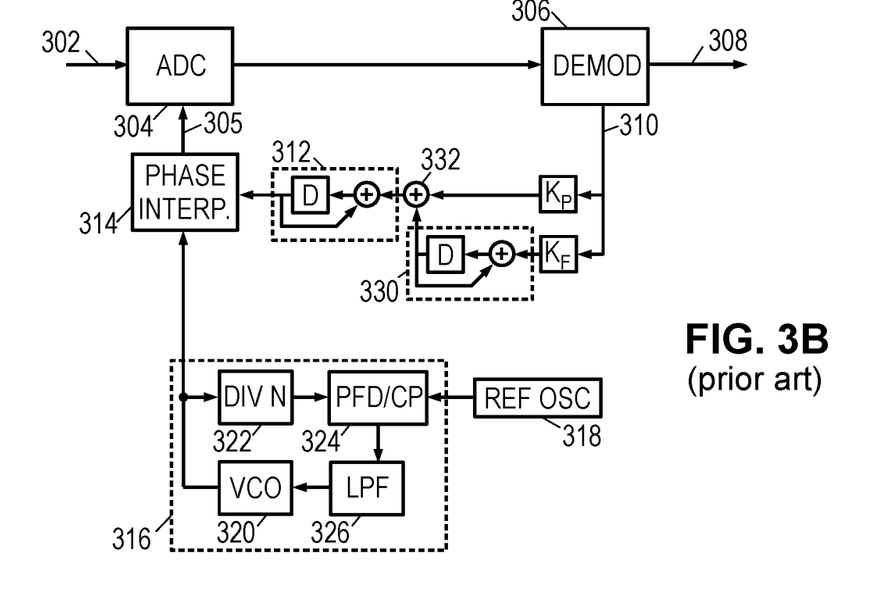
Figure 3C:
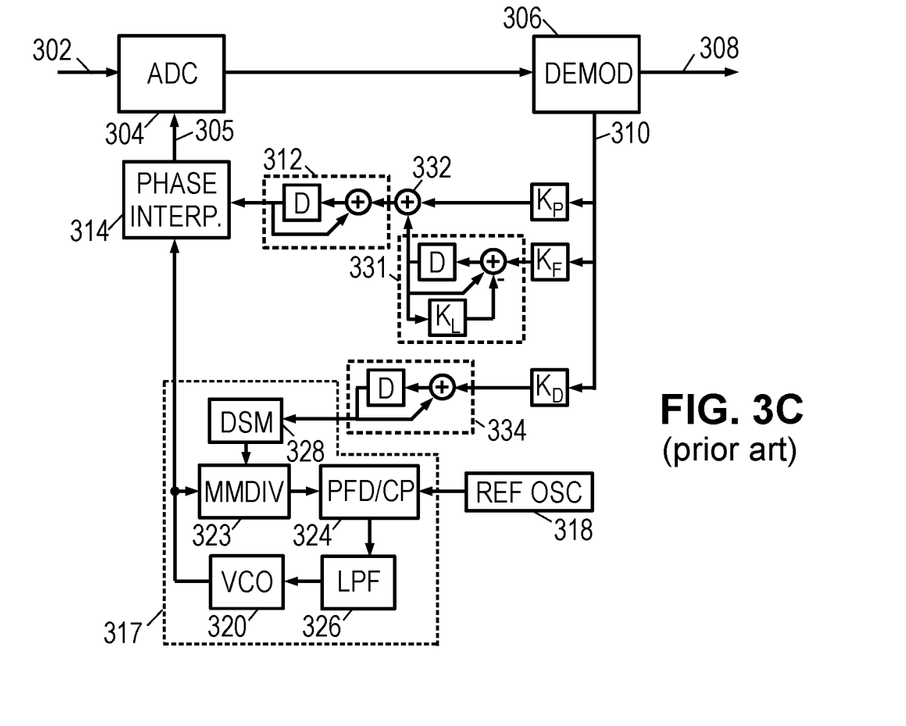

In most SerDes applications, high-speed serial data streams are sent without an accompanying clock signal, so the receiver derives a clock signal directly from the serial data stream. FIGS. 3A-3C shows various CDR techniques that may be implemented by an illustrative receiver which may be coupled to, or incorporated in, a deserializer block. Each of these receivers include an analog-to-digital converter 304 that samples the analog receive signal 302 at sample times corresponding to transitions in a sampling signal 305, thereby providing a digital receive signal to a demodulator 306. The demodulator 306 applies equalization and symbol detection using, e.g., a matched filter, a decision feedback equalizer, a maximum likelihood sequence estimator, or any other suitable demodulation technique. The resulting stream of demodulated symbols 308 may be provided as a parallelized symbol stream for handling by "on-chip" circuitry, e.g., error correction and FIFO buffering.

The demodulator includes some form of a timing error estimator to generate a timing error signal 310. Any suitable design may be used for the timing error estimator including, e.g., a bang-bang or proportional phase detector. One suitable timing error estimator is set forth in co-owned U.S. Pat. No. 10,447,509, "Precompensator-based quantization for clock recovery", which is hereby incorporated herein by reference in its entirety. Other suitable timing error estimators can be found in the open literature, including, e.g., Mueller, "Timing Recovery in Digital Synchronous Data Receivers", IEEE Trans. Commun., v24n5, May 1976, and Musa, "High-speed Baud-Rate Clock Recovery", U. Toronto Thesis, 2008.

In FIG. 3A, the timing error signal 310 is coupled via a feedback path to control a phase interpolator 314 in a fashion that statistically minimizes the timing error signal 310. In the feedback path, the timing error signal is scaled by a phase coefficient ($K_P$) and integrated by a phase error accumulator 312 to obtain a phase error signal (supplied as a control signal to the phase interpolator 314). The phase interpolator 314 operates on a clock signal from a phase lock loop (PLL) 316. The phase interpolator 314 may receive or construct different phases of the clock signal, combining the different phases in accordance with the control signal to provide the sampling signal having an interpolated phase more precisely matched to the symbols conveyed by the receive signal 302.

The clock signal produced by PLL 316 is a frequency-multiplied version of a reference clock signal from reference oscillator 318. A voltage controlled oscillator (VCO) 320 supplies the clock signal to both the phase interpolator 314 and to a counter 322 that divides the frequency of the clock signal by a constant modulus N. The counter 322 supplies the divided-frequency clock signal to a phase-frequency detector (PFD) 324. PFD 324 may use a charge pump (CP) as part of determining which input (i.e., the divided-frequency clock signal or the reference clock signal) has transitions earlier or more often than the other. A low pass filter 326 filters the output of PFD 324 to provide a control voltage to VCO 320. The filter coefficients are chosen so that the divided frequency clock becomes phase aligned with the reference oscillator.

The phase interpolator 314 is configured to interpolate the phase in discrete steps from 0 to 360°. A 7 bit control signal would enable 128 steps for a phase resolution of ~2.8°. Other resolutions would also be suitable. In any case, the phase accumulator may be implemented with a higher bit resolution for improved performance, with the control signal being derived using truncation of the least significant bit(s). For various implementation reasons, the 360° interpolation range of the phase interpolator may correspond to multiple symbol intervals, e.g., four, consequently reducing the number of phase increments per unit interval to, e.g., 32. The sub-unit phase may be determined by excluding the most significant bit(s) of the phase interpolator control signal.

For at least some contemplated uses, the reference oscillator 318 used by the receiver will often drift relative to the reference clock used by the transmitter, and may differ by hundreds of ppm. To mitigate this issue, FIG. 3B adds a second feedback path in which the timing error signal is scaled by a frequency coefficient ($K_F$) and integrated by a frequency error accumulator 330 to obtain a frequency offset signal. A summer 332 adds the frequency offset signal to the scaled timing error signal, supplying the sum to the phase error accumulator 312. The control signal produced by the phase error accumulator 312 compensates for both the frequency offset and phase error of the clock signal relative to the analog receive signal 302, thereby phase-aligning the sampling signal 305 with the data symbols in the analog receive signal 302.

In both FIGS. 3A and 3B, any frequency offset between the PLL's clock signal output and the analog data signal is corrected by a continuous phase rotation of the phase interpolator 314. This mode of operation imposes stringent demands on the linearity of the phase interpolator 314 over its entire tuning range, as the interpolator will repeatedly cycle through each of the phase interpolations during the continuous rotation. Any phase interpolation nonlinearity exhibits as periodic jitter in the sampling signal 305, which becomes particularly exaggerated when the incoming signal employs spread spectrum clocking (SSC) to reduce electromagnetic interference.

To address this nonlinearity issue, the receiver in FIG. 3C employs a third feedback path. The receiver retains the analog-to-digital converter 304 for sampling the analog receive signal 302 and providing a digital receive signal to the demodulator 306. As before, the demodulator incudes a timing error estimator that generates a timing error signal 310, and a first feedback path with the phase coefficient ($K_P$) scaling and phase error accumulator 312. In the second feedback path, the frequency error accumulator 330 (FIG. 3B) is replaced with a modified frequency error accumulator 331 that is a leaky integrator that multiplies the accumulated frequency error by ($1-K_L$) in each integration cycle. The leakage coefficient ($K_L$) represents a gradual memory loss which, while it enables the second feedback path to provide a fast response, causes the frequency offset signal to tend toward zero over longer time scales.

The PLL 316 is replaced with a fractional-N phase lock loop 317 controlled via a third feedback path, enabling any frequency offset to be corrected separately from the phase interpolator 314. The third feedback path includes a division-ratio scaling coefficient ($K_D$) and a division-ratio error accumulator 334, which supplies a division-ratio control signal to the fractional-N phase lock loop 317. The fractional-N phase lock loop 317 is used in place of the original phase lock loop 316 to provide fine-grained frequency control of the clock signal supplied to the phase interpolator 314. The division-ratio control signal adjusts the frequency offset of the clock signal relative to the data in the analog receive signal 302, substantially reducing the phase rotation rate needed from the phase interpolator 314.

A comparison of FIGS. 3B & 3C shows that the phase lock loop 316 and the fractional-N phase lock loop 317 both employ a PFD/CP 324 (comparing a divided frequency clock signal to the reference clock), low pass filter 326 (filtering the error to reduce noise), and a voltage controlled oscillator 320 (supplying the output clock signal). Rather than dividing the output clock signal with a fixed modulus divider 322, the fractional-N phase lock loop 317 uses a multi-modulus divider 323 that divides by N or N+1, depending on whether the modulus selection signal is asserted at the end of (or, in alternative embodiments, at the beginning of, or at any point during) a count cycle. A delta-sigma modulator (DSM) 328 converts the division-ratio control signal into pulses of the modulus selection signal. The pulse density controls what fractional value between N and N+1 the divider implements, enabling very fine control of the clock frequency supplied to the interpolator 314.

The division-ratio error accumulator 334, in combination with the low pass filter 326 of the phase lock loop 317, operates on the longer time scale to overcome the memory loss of the modified accumulator 331. Under steady-state or slow-changing conditions, the frequency offset correction is provided by the third feedback path, minimizing any effect of the phase interpolator nonlinearities. Where conditions where the frequency offset changes more quickly, the more transient corrections are provided by the first and second feedback paths.

An issue faced by the receivers of FIGS. 3A-3C at high baud rates, particularly in systems where spread spectrum clocking is employed, is that the clock recovery feedback paths have a significant loop delay that may interfere with attempts to improve transient response and increase the bandwidth of the clock recovery circuitry. The delay from phase error scaling, accumulation, interpolation, digitization, and detection operations, means that the phase error associated with the current phase interpolator setting continues to apply during the interval between when the phase error is determined and the associated correction is applied. From a control-theoretic standpoint, this loop delay rotates the phase of the open-loop transfer function, degrading the gain margin at high frequencies such as 50 or 100 MHz. While such degradation may not be an issue for clock recovery modules designed to provide a bandwidth from 1 MHz to 10 MHz, it becomes problematic when trying to provide good jitter tolerance for gigabaud data rates and/or accommodation for intentional clock frequency modulation such as that employed in systems using spread spectrum clocking (SSC). To support SSC, the clock recovery circuitry of the receiver must have sufficiently high bandwidth to track the intentional low-frequency jitter.

One potential approach to this issue is engineering the components to minimize the loop delay, e.g., by using a higher clock frequency for the digital circuitry. This approach remains limited by the critical path delay, but even more importantly, it increases power consumption, which can be undesirable. As a consequence, high-end serializer/deserializer (SerDes) modules either do not support SSC, or they support SSC only for drastically-reduced data rates.

Figure 4A:
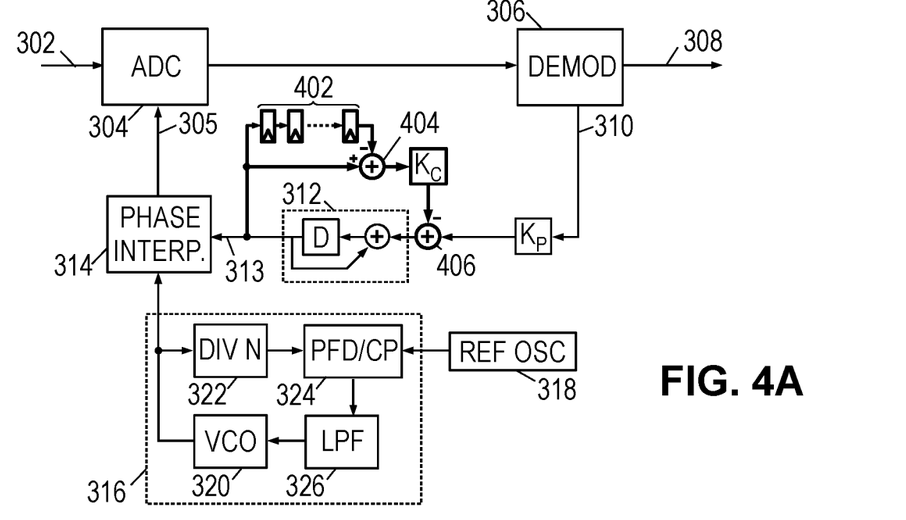
FIGS. 4A-4B show illustrative loop delay cancellation circuits suitable for the digital communications receiver of FIG. 3A.

FIG. 4A shows a first modified version of FIG. 3A, with loop-delay cancellation circuitry incorporated. The delay cancellation circuitry includes a buffer 402, difference elements 404, 406, and a cancellation coefficient $K_C$. Though not explicitly described below, we note here that the delay cancellation circuitry preferably operates only on the sub-unit portion of the control signal, discarding the most significant bits representing full symbol intervals, if any. In certain alternative embodiments, the delay cancellation operates on the full control signal.

The buffer 402 captures the control signal for the phase interpolator 314 and uses latches, flip-flops, registers, or other delay elements to provide a loop delay that replicates the first feedback path's loop delay. (The delay provided by the buffer equals the loop delay of the first feedback path minus the delay from other elements of the delay cancellation circuitry and minus the delay caused by the overlapped portion of the first feedback path. In other words, the buffer's delay does not include the delay of summers 404, 406, scaling element $K_C$, the phase error accumulator 312, and any truncation element that derives the control signal from the accumulated phase error.) A bypass path provides the current control signal to difference element 404, which subtracts the delayed control signal from the current control signal, yielding a signal representing a phase error attributable to the loop delay, also referred to herein as the "residual phase error". To optimize performance, this residual phase error is scaled by a coefficient $K_C$ before difference element 406 subtracts it from the input to the phase accumulator 312.

When the phase error accumulator 312 changes the control signal 313 to the phase interpolator 314, the delay cancellation circuitry uses that change to immediately provide feedback to the phase error accumulator, short-cutting the previous wait for the effect of the control signal change to propagate through the actual loop delay. The feedback thus enables the phase error accumulator to avoid operating on stale phase errors, enabling the control signal to be more responsive to current conditions. By the time the effect of the change in control signal 313 has propagated through the actual loop delay, the buffer also finishes propagating the delayed control signal, eliminating that change from the feedback of the delay cancellation circuitry. At the same time, the actual effect of the control signal change appears at the demodulator's timing error calculation, so that the feedback provided via the first feedback path takes over when that of the loop-delay cancellation circuit ceases. So long as the residual phase error is accurate, the delay cancellation circuitry reduces the effective loop delay to the delay of the bypass path (the path not passing through the buffer 402).

Figure 4B:
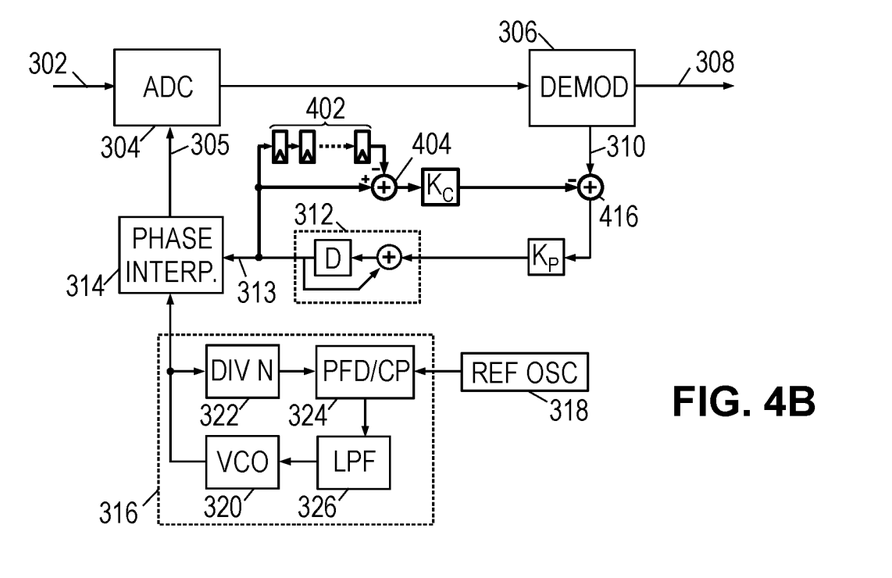

FIG. 4B shows a second modified version of FIG. 3A with loop-delay cancellation circuitry. Rather than having difference element 406 positioned after scaling element $K_P$, FIG. 4B provides the difference element 416 in the feedback path preceding the scaling element $K_P$. With suitable modification of the scale factors $K_C$ and/or $K_P$, these variations of the loop-delay cancellation circuit can be made nearly equivalent apart from implementation details such as data path width. Nevertheless, this figure may be helpful for understanding similar variations for the loop delay cancellation circuitry.

Figure 5A:
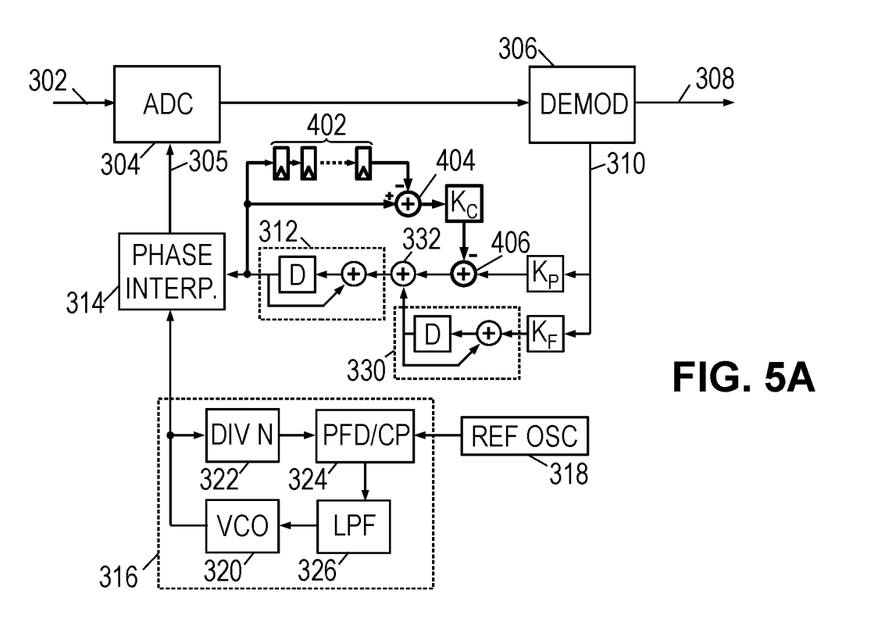
FIGS. 5A-5C show illustrative loop delay cancellation circuits suitable for the digital communications receiver of FIG. 3B.
Figure 5B:
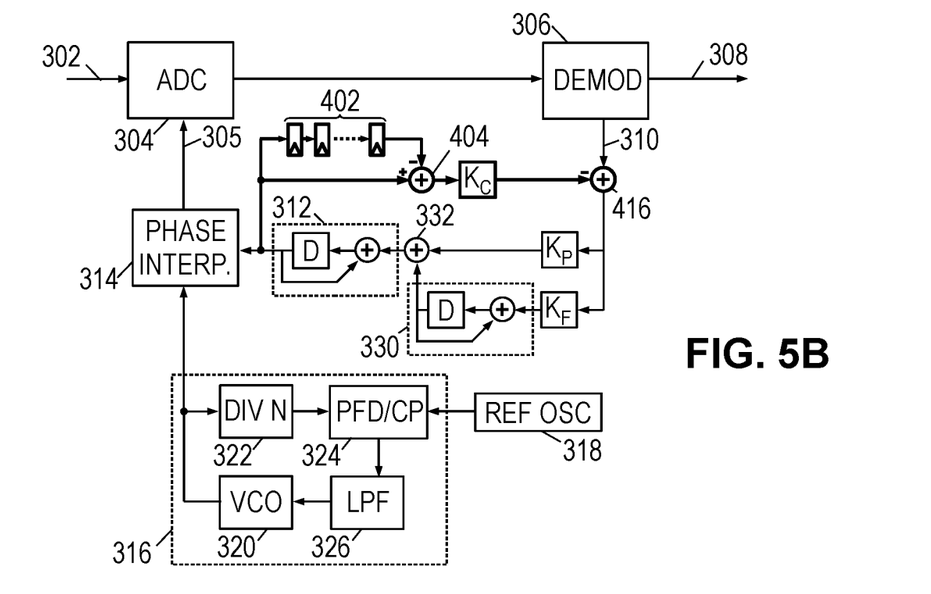
Figure 5C:
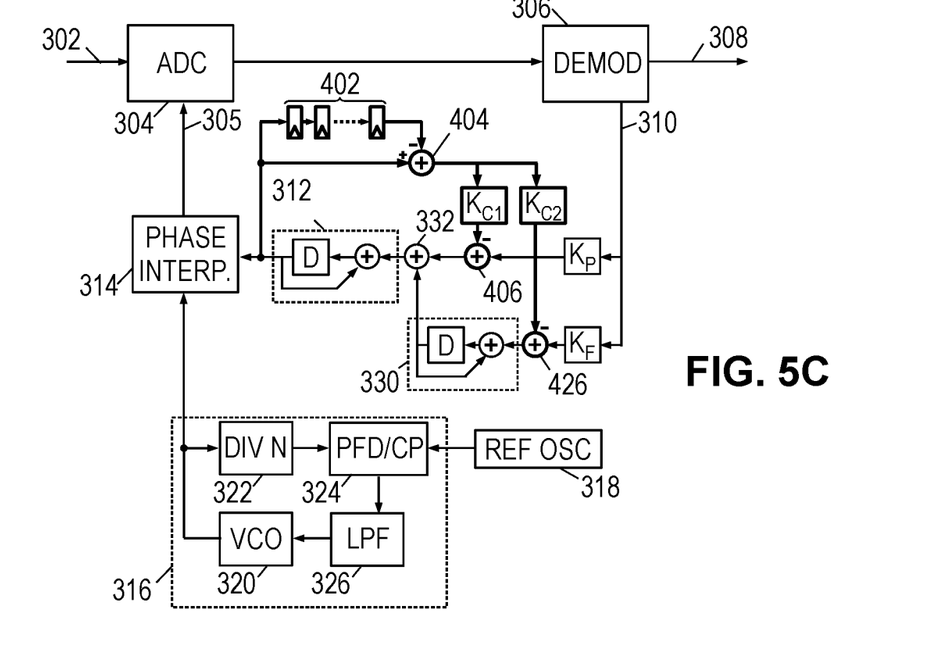
Figure 6A:
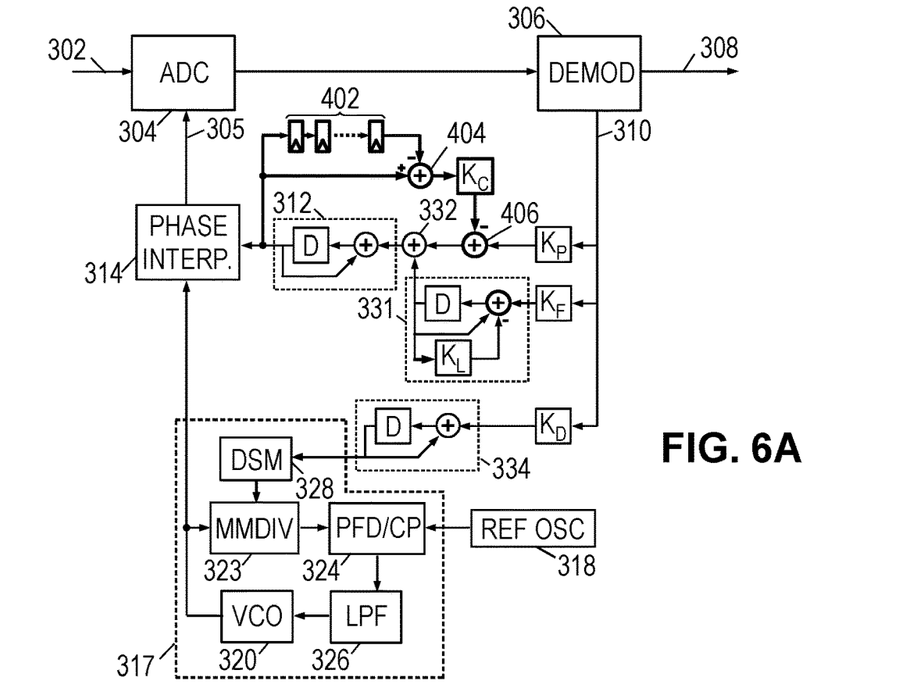
FIGS. 6A-6C show illustrative loop delay cancellation circuits suitable for the digital communications receiver of FIG. 3C.

The receivers of FIGS. 3B and 3C can similarly be provided with loop delay cancellation circuitry as shown in FIGS. 5A-5C and 6A-6C, respectively. FIG. 5A shows a first modified version of FIG. 3B with loop-delay cancellation circuitry including a buffer 402, difference elements 404, 406, and a cancellation coefficient $K_C$, operating to reduce the effective delay of the first feedback path in the same fashion as with FIG. 4A. FIG. 6A similarly shows a first modified version of FIG. 3C with similar loop-delay cancellation circuitry operating to reduce the effective delay of the first feedback path. Such reduction enables the use of a larger phase coefficient $K_P$ and makes the clock recovery circuitry more responsive to transients and spread spectrum modulation without degradation of the gain margin. The second and third feedback paths generally operate with longer adaptation windows and hence may not require similar reduction of their loop delay. With the reduction of the loop delay for the first feedback path and the increase in phase coefficient $K_P$, the frequency coefficient $K_F$ and division-ratio coefficient $K_D$ can be increased to increase bandwidth and improve transient response of the second order feedback paths, and providing support for higher degrees of SSC frequency modulation.

Figure 6B:
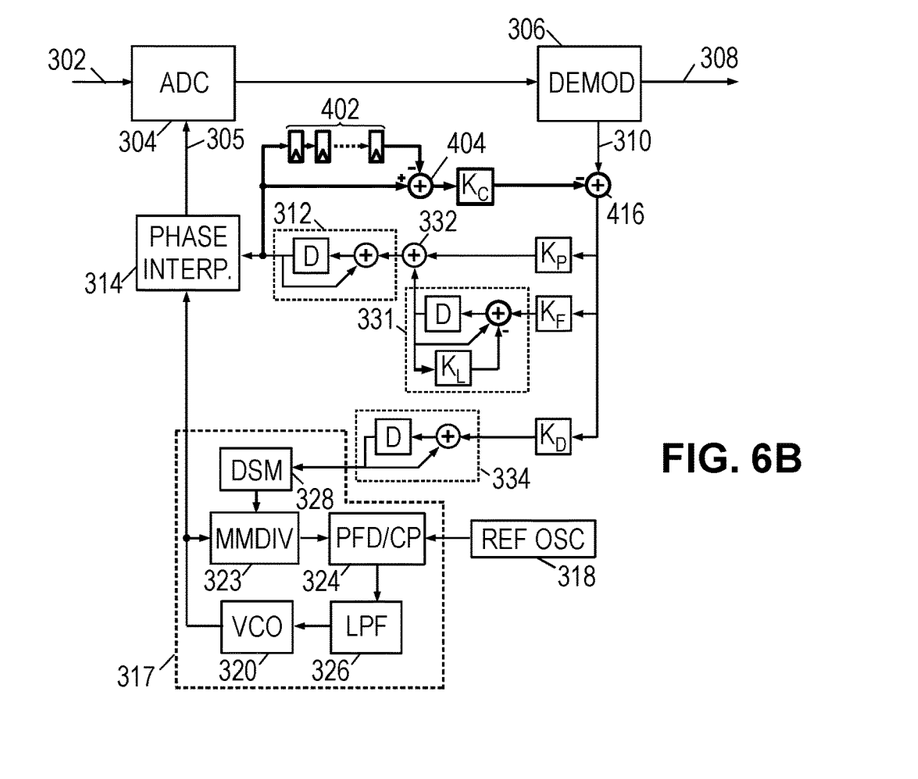
Figure 6C:
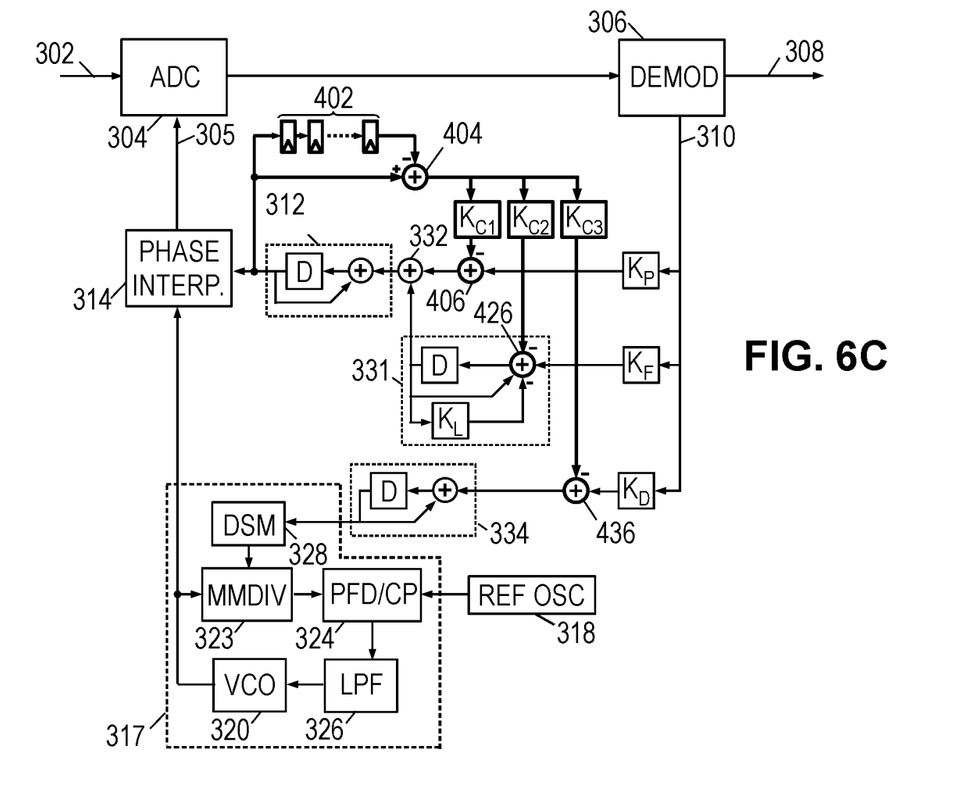

FIG. 5B shows a second modified version of FIG. 3B that, like FIG. 4B, provides a difference element 416 to subtract the residual phase error from the timing error signal 310 ahead of scaling elements $K_P$ and $K_F$. FIG. 6B similarly shows a second modified version of FIG. 3C. This configuration operates to reduce the effective delay of both the first feedback path and the second-order feedback paths, further enhancing performance of the clock recovery circuitry. With the difference element 416 preceding the scaling elements, a wider data path may be required for the multipliers. To avoid increasing the data path width, a third modified version of FIG. 3B and FIG. 3C is shown in FIG. 5C and FIG. 6C respectively. The difference element 406 for the first feedback path is paralleled with an additional difference element 426 for the second feedback path and (in FIG. 6C) difference element 436 for the third feedback path. Additional scaling elements $K_{C1}$, $K_{C2}$, $K_{C3}$ enable the loop-delay cancellation coefficients to be customized for each feedback path.

Note that even in the more complex variations, the power consumption associated with the loop delay cancellation circuitry is far lower than that associated with the higher clock frequencies that would otherwise be needed to achieve similar performance improvements.

Figure 7:
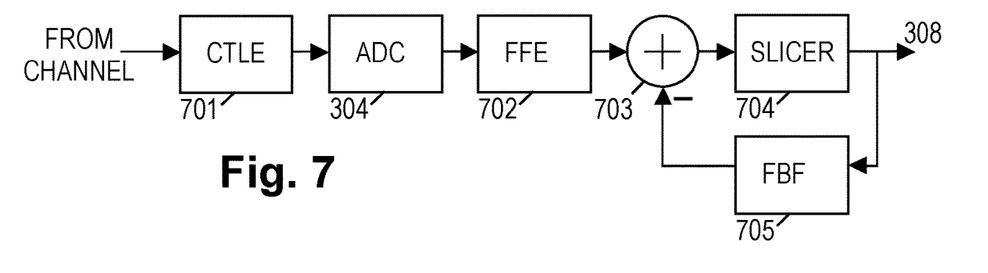
FIG. 7 is a block diagram of an illustrative receiver having decision feedback equalization ("DFE").
Figure 8:
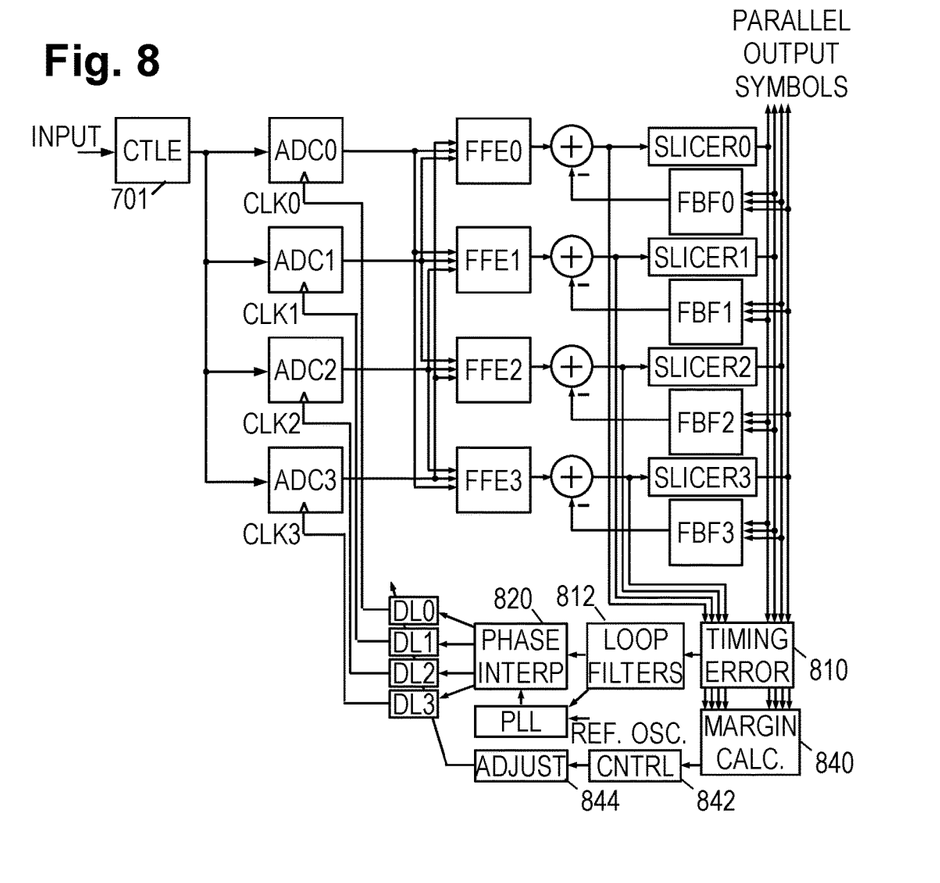
FIG. 8 is a block diagram of an illustrative receiver having parallelized DFE.

FIGS. 7 and 8 show illustrative receiver embodiments to provide additional detail for implementation of the demodulator 306, as well as insight into the adaptation of the feedback paths for parallelization.

FIG. 7 shows an illustrative digital receiver that includes a continuous time linear equalizer ("CTLE") 701 to attenuate out-of-band noise and to optionally provide some spectral shaping to improve a response to high-frequency components of the receive signal. ADC 304 is provided to digitize the receive signal, and a digital filter (also known as a feed-forward equalizer or "FFE") 702 performs further equalization to further shape the overall channel response of the system and minimize the effects of leading ISI on the current symbol. As part of the shaping of the overall channel response, the FFE 702 may also be designed to shorten the channel response of the filtered signal while minimizing any attendant noise enhancement.

A summer 703 subtracts an optional feedback signal from the output of FFE 702 to minimize the effects of trailing ISI on the current symbol, yielding an equalized signal that is coupled to a decision element ("slicer") 704. The decision element includes one or more comparators that compare the equalized signal to corresponding decision thresholds to determine for each symbol interval which constellation symbol the signal's value most closely corresponds to. The equalized signal may also be termed a "combined signal" herein.

The decision element 704 accordingly produces a sequence of symbol decisions (denoted $A_k$, where k is the time index). In certain contemplated embodiments, the signal constellation is a bipolar (non-return-to-zero) constellation representing −1 and +1, necessitating only one comparator using a decision threshold of zero. In certain other contemplated embodiments, the signal constellation is PAM4 (−3, −1, +1, +3), necessitating three comparators employing the respective decision thresholds −2, 0, and +2. (The unit for expressing symbol and threshold values is omitted for generality, but for explanatory purposes may be presumed to be volts. In practice, a scale factor will be employed.)

A feedback filter ("FBF") 705 derives the feedback signal using a series of delay elements (e.g., latches, flip flops, or registers) that store the recent output symbol decisions ($A_{k-1}$, $A_{k-2}$, ..., $A_{k-N}$, where N is the number of filter coefficients $f_i$). Each stored symbol is multiplied with a corresponding filter coefficient $f_i$, and the products are combined to obtain the feedback signal.

As an aside, we note here that the receiver also includes a filter coefficient adaptation unit, but such considerations are addressed in the literature and are well known to those skilled in the art. Nevertheless, we note here that at least some contemplated embodiments include one or more additional comparators in the decision element 704 to be employed for comparing the combined signal to one or more of the symbol values, thereby providing an error signal that can be used for timing recovery and/or coefficient adaptation.

As the symbol rates increase into the gigahertz range, it becomes increasingly difficult for the ADC 304 and demodulator 306 components to perform their required operations completely within each symbol interval, at which point it becomes advantageous to parallelize their operations. Parallelization generally involves the use of multiple components that share the workload by taking turns, and thereby providing more time for each of the individual components to complete their operations. Such parallel components are driven by a set of staggered clock signals. For example, a four-fold parallelization employs a set of four clock signals, each having a frequency that is one-fourth of the symbol rate so that each symbol interval contains only one upward transition in the set of staggered clock signals. Though a four-fold parallelization is used for discussion purposes here, the actual degree of parallelization can be higher, e.g., 8-, 16-, 32-, or 64-fold. Moreover, the degree of parallelization is not limited to powers-of-two.

FIG. 8 shows an illustrative receiver having a parallelized equalizer implementation (including the optional feedback filters for DFE). As with the implementation of FIG. 7, the CTLE 701 filters the channel signal to provide a receive signal, which is supplied in parallel to an array of analog-to-digital converters (ADC0-ADC3). Each of the ADC elements is provided with a respective one of the staggered clock signals. The clock signals have different phases, causing the ADC elements to take turns sampling and digitizing the receive signal, so that only one of the ADC element outputs is transitioning at any given time.

An array of FFEs (FFE0-FFE3), each forms a weighted sum of the ADC element outputs. The weighted sums employ filter coefficients that are cyclically shifted relative to each other. FFE0 operates on the held signals from ADC3 (the element operating prior to CLK0), ADC0 (the element responding to CLK0), and ADC1 (the element operating subsequent to CLK0), such that during the assertion of CLK2, the weighted sum produced by FFE0 corresponds to the output of FFE 702 (FIG. 7). FFE1 operates on the held signals from ADC0 (the element operating prior to CLK1), ADC1 (the element responding to CLK1), and ADC2 (the element operating subsequent to CLK1), such that during the assertion of CLK3, the weighted sum corresponds to that of FFE 702. And the operation of the remaining FFEs in the array follows the same pattern with the relevant phase shifts. In practice, the number of filter taps may be smaller, or the number of elements in the array may be larger, so as to offer a longer window of valid output.

As with the receiver of FIG. 7, a summer may combine the output of each FFE with a feedback signal to provide an equalized signal to a corresponding decision element. FIG. 8 shows an array of decision elements (Slicer0-Slicer3), each operating on an equalized signal derived from a respective FFE output. As with the decision element of FIG. 7, the illustrated decision elements employ comparators to determine which symbol the equalized signal most likely represents. The decisions are made while the respective FFE outputs are valid (e.g., Slicer0 operates while CLK2 is asserted, Slicer1 operates while CLK3 is asserted, etc.). Preferably the decisions are provided in parallel on an output bus to enable a lower clock rate to be used for subsequent operations.

An array of feedback filters (FBF0-FBF3) operates on the preceding symbol decisions to provide the feedback signals for the summers. As with the FFEs, the inputs for the FBFs are shifted cyclically and provide a valid output only when the inputs correspond to the contents of the FBF 705 (FIG. 7), coinciding with the time window for the corresponding FFE. In practice, the number of feedback filter taps may be smaller than what is shown, or the number of array elements may be larger, so as to offer a longer window of valid output.

As with the decision element of FIG. 7, the decision elements in FIG. 8 may each employ additional comparators to provide timing recovery info, coefficient training info, and/or precomputation to unroll one or more taps of the feedback filter. In the embodiment of FIG. 8, the digital timing circuit is also parallelized, with a timing error estimator 810 accepting symbol decisions and equalized signals in parallel to determine a parallelized version of the timing error signal 310 (FIGS. 4A-6C). A set of timing loop filters 812 preferably implements the first, second, and third feedback paths, with loop-delay cancellation circuitry, to provide a control signal for the phase interpolator 820 and division-ratio control signal for the PLL. The phase interpolator 820 operates similarly to phase interpolator 314 to convert the PLL clock signal into a set of staggered clock signals having evenly spaced phases with symbol-aligned transitions. A set of delay lines (DL0-DL3) is provided for fine-tuning the individual clock phases relative to each other as needed to, e.g., compensate for different propagation delays of individual ADC elements.

The delay lines may be individually adjusted by a clock skew adjustment circuit 844 based on parameters from a controller 842. The controller 842 may optimize the clock skew adjustment settings based on a reliability indicator from a monitor circuit. In FIG. 8, the monitor circuit is a margin calculator 840 that calculates the minimum difference between the equalized signal and the decision threshold (or equivalently, the maximum error between the equalized signal and the nominal symbol value). Clock skew adjustments are described in greater detail in co-owned U.S. Pat. No. 10,992,501 ("Eye Monitor for Parallelized Digital Equalizers"), which is hereby incorporated herein by reference in its entirety.

The foregoing integrated circuits would typically be created using masks for patterning layers on semiconductor substrates during an integrated circuit manufacturing process. The mask patterns can be generated using commercially available software for converting the circuit schematics (usually expressed using a hardware description language such as Verilog) into semiconductor process masks. The circuits may be sub-units of more complex integrated circuit devices whose designs have been built up from modular components in a design database which resides on nontransient information storage media. Once the circuits are fully designed, software may convert the integrated circuits into semiconductor mask patterns also stored on nontransient information storage media and conveyed to the various process units in a suitable assembly line of an integrated circuit manufactory.

Numerous alternative forms, equivalents, and modifications will become apparent to those skilled in the art once the above disclosure is fully appreciated. For example, the foregoing description focuses on digital receivers, but the disclosed principles for loop-delay cancellation are also applicable to receivers using analog timing recovery circuitry, in which case the buffer may be replaced with a delay line, chain of amplifiers, or other analog circuitry for implementing a delay. The integration-based accumulators described herein can be replaced with other recursive or moving-average filter implementations providing a low-pass filter response. It is intended that the claims be interpreted to embrace all such alternative forms, equivalents, and modifications that are encompassed in the scope of the appended claims.

What is claimed is:

1. An integrated receiver circuit that comprises:
   a sampling element that produces a digital receive signal by sampling an analog receive signal in accordance with a sampling signal;
   a timing error estimator that produces a timing error signal indicating an estimated timing error of the sampling signal relative to the analog receive signal;
   a first feedback path that controls a sampling signal phase to optimize the timing error signal, the first feedback path having an associated loop delay that causes a residual phase error; and
   a loop-delay cancellation circuit that buffers the sampling signal phase to reduce the residual phase error.

2. The integrated receiver circuit of claim 1, wherein the loop-delay cancellation circuit comprises a series of delay elements to replicate said loop delay of the first feedback path.

3. The integrated receiver circuit of claim 2, wherein the loop-delay cancellation circuit further comprises a bypass path coupling a current sampling signal phase to a difference element that subtracts a buffered sampling signal phase from the current sampling signal phase to determine a residual phase error.

4. The integrated receiver circuit of claim 3, wherein the first feedback path includes:
   a phase error accumulator; and
   a difference element that reduces an input to the phase error accumulator based on the residual phase error.

5. The integrated receiver circuit of claim 4, wherein the loop-delay cancellation circuit further comprises a scaling element that scales the residual phase error by a coefficient $K_C$.

6. The integrated receiver circuit of claim 4, further comprising:
   a phase interpolator coupled to the phase error accumulator to receive a sampling signal phase control signal and to apply a corresponding phase shift to a clock signal to produce the sampling signal for the sampling element.

7. The integrated receiver circuit of claim 6, further comprising:
   a fractional-N phase lock loop that provides the clock signal;
   a second feedback path coupling the timing error signal to the phase interpolator; and
   a third feedback path coupling the timing error signal to the fractional-N phase lock loop, the second and third feedback paths minimizing a frequency offset component of the estimated timing error.

8. The integrated receiver circuit of claim 3, wherein the first feedback path includes a phase error accumulator, wherein the integrated receiver circuit further comprises:
a second feedback path having a frequency error accumulator;
a third feedback path having a division-ratio error accumulator; and
one or more difference elements that reduce inputs to the phase error accumulator, the frequency error accumulator, and the division-ratio error accumulator based on the residual phase error.

9. The integrated receiver circuit of claim 3, wherein the first feedback path includes a phase error accumulator, wherein the integrated receiver circuit further comprises:
a second feedback path having a frequency error accumulator; and
one or more difference elements that reduce inputs to the phase error accumulator and the frequency error accumulator based on the residual phase error.

10. A clock recovery method that comprises, in an integrated receiver circuit:
sampling an analog receive signal in accordance with a sampling signal to obtain a digital receive signal;
producing a timing error signal indicating an estimated timing error of the sampling signal relative to the analog receive signal;
controlling a sampling signal phase via a first feedback path to optimize the timing error signal, the first feedback path having an associated loop delay that causes a residual phase error; and
buffering the sampling signal phase to reduce a magnitude of the residual phase error.

11. The clock recovery method of claim 10, wherein said buffering is performed using a series of delay elements to replicate said loop delay of the first feedback path.

12. The clock recovery method of claim 11, further comprising coupling a current sampling signal phase via a bypass path to a difference element that subtracts a buffered sampling signal phase from a current sampling signal phase to determine a residual phase error.

13. The clock recovery method of claim 12, wherein said controlling includes:
accumulating an input to a phase error accumulator to produce a sampling signal phase control signal; and
reducing the input to the phase error accumulator based on the residual phase error.

14. The clock recovery method of claim 13, wherein said controlling includes:
accumulating an input to a frequency error accumulator to produce the sampling signal phase control signal; and
reducing the input to the frequency error accumulator based on the residual phase error.

15. The clock recovery method of claim 13, further comprising: using a phase interpolator to apply a phase shift corresponding to the sampling signal phase control signal to produce the sampling signal.

16. The clock recovery method of claim 15, further comprising:
supplying a clock signal to the phase interpolator using a fractional-N phase lock loop;
coupling the timing error signal to the phase interpolator via a second feedback path to minimize a short-term frequency offset component of the estimated timing error; and
coupling the timing error signal to the fractional-N phase lock loop via a third feedback path to minimize a long-term frequency offset component of the estimated timing error, the third feedback path including a division-ratio error accumulator; and
reducing an input to the division-ratio error accumulator based on the residual phase error.

* * * * *